United States Patent [19]
Tokuda et al.

[11] Patent Number: 6,035,213
[45] Date of Patent: Mar. 7, 2000

[54] DUAL-MODE CELLULAR TELEPHONE SYSTEM

[75] Inventors: Masamori Tokuda, Sakura; Masao Miyazaki, Chiba; Takeshi Okamoto, Sakura, all of Japan

[73] Assignee: Sharp Kabushiki Kaisha, Osaka, Japan

[21] Appl. No.: 08/868,993

[22] Filed: Jun. 4, 1997

[30] Foreign Application Priority Data

Jun. 5, 1996 [JP] Japan ................................ 8-142700

[51] Int. Cl.⁷ .................................................. H04B 1/38
[52] U.S. Cl. ........................ 455/553; 370/441; 455/296
[58] Field of Search .................................. 455/550, 553, 455/63, 206, 226.1, 266, 295, 296, 305, 307, 552, 340, 180.1, 188.1; 370/335, 342, 332, 441, 320, 465

[56] References Cited

U.S. PATENT DOCUMENTS

| | | | |
|---|---|---|---|
| 5,222,144 | 6/1993 | Whikehart | 381/15 |
| 5,226,057 | 7/1993 | Boren | 375/350 |
| 5,325,188 | 6/1994 | Scarpa | 455/307 |
| 5,469,115 | 11/1995 | Peterzell et al. | 330/129 |
| 5,584,056 | 12/1996 | Kim | 455/572 |
| 5,596,600 | 1/1997 | Dimos et al. | 375/206 |
| 5,640,385 | 6/1997 | Long et al. | 370/335 |
| 5,758,296 | 5/1998 | Nakamura | 455/575 |

FOREIGN PATENT DOCUMENTS

| | | |
|---|---|---|
| 5-68017 | 3/1993 | Japan . |
| 5252135 | 9/1993 | Japan . |

*Primary Examiner*—Reinhard J. Eisenzopf
*Assistant Examiner*—Charles N. Appiah

[57] ABSTRACT

A dual-mode cellular telephone system which is capable of suppressing a narrow-band disturbing signal appearing in a mobile station of a dual-mode cellular telephone system adapted for both an analog system and a digital CDMA system. A CDMA signal from a CDMA base station, and a narrow-band signal from an analog system are received through an antenna by a receiver, whereby they are amplified, subjected to frequency conversion, and input to a variable notch filter. A disturbing signal detection circuit supplies the variable notch filter with a control signal for varying its frequency. Namely, the disturbing signal detection circuit detects a case that an output level of the variable notch filter is at a minimum by changing the notch frequency via a series of sweeping control signals. A control signal at which the output level of the variable notch filter is at a minimum is then fed to the variable notch filter, thereby effectively suppressing any intermodulation distortions present in the mobile station.

10 Claims, 11 Drawing Sheets

DUAL-MODE CELLULAR TELEPHONE SYSTEM

BACKGROUND OF THE INVENTION

Together with multimedia, personal communications allowing people to communicate with anyone by any medium, anywhere and at any time represent one of the most prospective fields of strong potential. Personal communications are included in both concepts of wired and wireless telecommunications. Great hopes are placed on wireless communications. In wireless communications, portable phones have been spread throughout in developed countries so rapidly that the conventional analog communication system could not satisfy the increasing demand. Accordingly, digital systems which are excellent in capacity of accommodating subscribers, communication costs, secrecy and a variety of communications are nowadays prevailing over the analog systems. There are two digital methods—TDMA (Time-Division Multiple Access) and CDMA (Code-Division Multiple Access). The CDMA is more attractive to users since it can accommodate more subscribers than the TDMA method.

The CDMA system uses the spread-spectrum technique that transmits a signal carrying an information spread over a bandwidth much wider than the information itself-occupied bandwidth by using spread coding system. There are two methods of spread-spectrum technique: one is direct-spreading (DS) method and the other is frequency hopping (FH) method. The cellular telephone system uses the DS method. With the CDMA using the DS technique, each mobile station may spread spectra by using different spread code and transmit the coded channel signal multiplied in the same bandwidth. On the other hand, The receiving side demodulates only the desired signal by despreading with the same spread code of the desired receive channel, separating other interference signals as wide-band noises. Thus, the CDMA system using the spread-spectrum technique offers a number of advantages: it can accommodate a large number of subscribers, allow asynchronous accessing, bear against multi-path fading, enable soft-hand-off by using a plurality of rake-receivers and have a high durability against interferences from other systems and a high secrecy property. On the other hand, mobile communications may usually have interference signals much larger than desired receive signals, causing impairment of a carrier-to-noise (C/N) ratio of a signal after despreading, i.e., making it impossible to conduct correct communications. Accordingly, the CDMA system requires fine control of transmission power.

Thus, the digital communication systems are replacing the analog communication systems since the former systems have excellent features over the latter. However, digital and analog systems coexist while shifting to the digital communications. Mobile stations must be dual-mode terminals adapted to analog and digital systems.

In the dual-mode cellular telephone systems adapted to the analog system and the digital CDMA system, analog and digital systems can work in different frequency spectra in the same area or neighboring areas. However, the following four kinds of interference modes may occur between the base stations and mobile stations of two different systems.

(1) Interference from the analog base station to the digital CDMA mobile station;
(2) Interference from the digital CDMA base station to the analog mobile station;
(3) Interference from the analog mobile station to the digital CDMA base station and
(4) Interference from the digital CDMA mobile station to the analog base station.

Among the above, interference mode (1) is the most important. Namely, the interference mode (1) becomes very large at a mobile station working in the digital CDMA mode if the mobile station locates far from the CDMA base station and near to the analog base station. Hereinafter explains a disturbance by interference from an analog base station to a digital CDMA mobile station. The mobile station is communicating in the CDMA mode with a CDMA base station, receiving, at the same time, a number of narrow-band signals as disturbing signals from an analog base station existing in the neighboring area. In this case, the narrow-band analog signals may largely affect the mobile station since they have much a higher level than the desired CDMA-band signal.

Three interference modes may occur as follows:
(a) An interference by intermodulation distortion caused from non-linearity of a receiver of the CDMA mobile station;
(b) An interference by intermodulation distortion caused from non-linearity of a transmitter system of the analog base station;
(c) An interference by sideband noises of transmission signals from the analog base station.

The interference mode (c) is a phenomenon where sideband noises of an analog signal from an analog base station may fall, as a disturbing signal, into a bandwidth of the CDMA system if the analog transmission channel bandwidth is near the CDMA bandwidth. The effect of this mode is smaller than the modes (a) and (b).

The causes and problems of interference modes (a) and (b) are as follows:

There's a case that a mobile station working in the CDMA mode are receiving a number of analog system signals. When a large-power level narrow-band analog signals ($f_1$, $f_2$ and so on) are input to a receiver, a large number of third and fifth intermodulation distortions ($2f_1-f_2$, $2f_2-f_1$, $3f_1-2f_2$, $3f_2-2f_1$ and so on) may occur in a receiver due to the non-linearity of its components (e.g., a LNA (Low Noise Amplifier), mixer and so on), producing a large number of narrow-band disturbing signals in a frequency band corresponding to the CDMA band. The produced narrow-band disturbing signals having very high levels results in increasing noise level after despreading the received signal by the despreading portion. Consequently, such a problem arises that the signal may represent erroneous data due to its insufficient carrier-to-noise (C/N) ratio.

An analog base station transmits a large number of narrow-band signals at a time and, therefore, may produce a large number of narrow-band disturbing signals within a frequency band corresponding to a CDMA band due to intermodulation distortions (of 3rd-order, 5th-order and so on) if its transmission system (transmission power amplifier) has non-linearity. Accordingly, the analog transmission system is usually designed so that intermodulation distortion may be satisfactorily small. However, the CDMA mobile station may receive at its receiver a relatively high-level narrow-band disturbing signal while it works near the analog base station. Consequently, a noise level of the received signal is increased after despreading by a despreading portion. An erroneous data may be produced due to insufficient carrier-to-noise ratio. This is a problem to be solved.

SUMMARY OF THE INVENTION

The present invention is intended to provide a dual-mode cellular telephone system adapted to work in both analog mode and digital CDMA mode, which mobile station is provide-d with a narrow-bard disturbing signal suppression circuit capable of effectively suppressing narrow-band disturbing signals occurring thereat and influencing a receiver.

An object of the present invention is to provide a dual-mode cellular telephone system adapted to an analog system and a digital CDMA system, wherein a mobile station receiver is provided with a narrow-band disturbing signal suppression circuit with a notch filter for suppressing a disturbing signal resulted from an intermodulation distortion produced by a plurality of transmission channel signals from an analog base station.

Another object of the present invention is to provide a dual-mode telephone system adapted to an analog system and a digital CDMA system, wherein a mobile station receiver is provided with a narrow-band disturbing signal suppression circuit with a notch filter for suppressing a disturbing signal resulted from an intermodulation distortion produced inside the receiver when receiving a plurality of transmission channel signals from an analog base station.

Another object of the present invention is to provide a dual-mode cellular telephone system which is characterized in that the notch filter has at least one previously determined notch frequency.

Another object of the present invention is to provide a dual-mode cellular telephone system which is characterized in that the mobile station is provided with a receiving portion and a level detecting circuit which monitors an output level of the receiving portion and, only in the case of the output level exceeding a previously determined reference level, controls the notch filter to possess the specified notch characteristic.

Another object of the present invention is to provide a dual-mode cellular telephone system which is characterized in that a notch frequency of the notch filter is variable and is controlled to be the same as a presumable frequency of a narrow-band disturbance signal.

Another object of the present invention is to provide a dual-mode cellular telephone system which is characterized in that the notch filter has a variable notch frequency under control and is provided with a disturbing signal detection circuit for detecting a specified value of the variable notch frequency, at which the notch filter has a minimal output, and supplying the notch filter with a control signal corresponding to the detected frequency.

Another object of the present invention is to provide a dual-mode cellular telephone system which is characterized in that the notch filter has a plurality of notch frequencies under control being variable at a time and is provided with the disturbing signal detection circuit for detecting a combination of the plurality of notch frequencies under control, at which the notch filter has a minimal output, and supplying the notch filter with a control signal corresponding to the detected combination of plurality of notch the frequencies under control.

Another object of the present invention is to provide a dual-mode cellular telephone system which is characterized in that the notch filter has two notch frequencies being variable at a time, one of which is variable within a lower sub-band of a desired band and the other is variable within a higher sub-band of the desired band.

Another object of the present invention is to provide a dual-mode cellular telephone system which is characterized in that a combination of the plurality of notch frequencies under control is determined, then several of the notch frequencies are fixed and the other notch frequencies are continuously changed while detecting a change in an output level of the notch filter during communications.

Another object of the present invention is to provide a dual-mode cellular telephone system which is characterized in that the disturbing signal detecting circuit monitors an output level of the notch filter and, only in the case of the output level exceeding a predetermined reference level, controls the notch filter to have a notch characteristic.

Another object of the present invention is to provide a dual-mode cellular telephone system which is characterized in that the notch filter has a variable notch frequency under control and is provided with a frequency detecting circuit for analyzing a frequency component exerting a narrow-band disturbance on a CDMA-band signal and supplying the notch filter with a control signal corresponding to the detected frequency component.

Another object of the present invention is to provide a dual-mode cellular telephone system which is characterized in that the frequency detecting circuit performs Fourier transformation.

Another object of the present invention is to provide a dual-mode cellular telephone system which is characterized in that the frequency detecting circuit monitors a received signal level of the mobile station and, only in the case of the received signal level exceeding a predetermined reference level, controls the notch filter to have a notch characteristic.

In the above-mentioned dual-mode cellular telephone system, the notch filter can effectively suppress a disturbing signal due to intermodulation distortion caused by a plurality of transmission channel signals from the analog base station as well as a disturbing signal due to intermodulation distortion occurred in a receiver when having received a plurality of transmission channel signals from the analog base station. This makes it possible to maintain a sufficient carrier-to-noise ratio of a desired signal after despreading.

With the notch filter having a variable notch frequency, the disturbing signal detection circuit detects a notch frequency at which the notch filter has a minimal output and gives the notch filter a control signal corresponding to the detection result.

With the notch filter having a plurality of notch frequencies variable at the same time, the disturbing signal detection circuit detects a combination of the plurality of notch frequencies at which the notch filter has a minimal output and gives the notch filter a control signal corresponding to the detection result.

The frequency detecting circuit analyzes frequency components giving a narrow-band disturbance to a CDMA band signal and gives the notch filter a control signal corresponding to the analyzing result.

PREFERRED EMBODIMENTS OF THE INVENTION

Prior to explaining preferred embodiments of the present invention a conventional, dual-mode cellular telephone system will be described below as references for the present invention.

Together with multimedia, personal communications allowing people to communicate with anyone by any medium, anywhere and at any time represent one of the most prospective fields of strong potential. Personal communications are included in both concepts of wired and wireless telecommunications. Great hopes are placed on wireless communications. In wireless communications, portable phones have been spread today in developed countries so rapidly that the conventional analog communication system could not satisfy the increasing demand. Accordingly, digital systems which are excellent in capacity of accommodating subscribers, communication costs, secrecy and variety of communications are nowadays prevailing over the analog systems. There are two digital methods—TDMA (Time-Division Multiple Access) and CDMA (Code-Division Multiple Access). The CDMA is now much attracts the users since it is excellent in the capacity of accommodating subscribers than the TDMA method.

The CDMA system uses the spread-spectrum technique that transmits a signal carrying an information spread over a bandwidth much wider than the information itself-occupied bandwidth by using spread coding system. There are two methods of spread-spectrum technique: one is direct-spreading (DS) method and the other is frequency hopping (FH) method. The cellular telephone system uses the DS method. With the CDMA using the DS technique, each mobile station may spread spectra by using different spread code and transmit the coded channel signal multiplied in the same bandwidth. On the other hand, the receiving side demodulates only the desired signal by despreading with the same spread code of the desired receive channel, separating other interference signals as wide-band noises. Thus, the CDMA system using the spread-spectrum technique offers a number of advantages: it can accommodate a large number of subscribers, allow asynchronous accessing, bear against multi-path fading, enable soft-hand-off by using a plurality of rake-receivers and have a high durability against interferences from other systems and a high secrecy property. On the other hand, mobile communications may usually have disturbing signals much larger than desired receive signals, causing impairment of a carrier-to-noise (C/N) ratio of a signal after despreading, i.e., making it impossible to conduct correct communications. Accordingly, the CDMA system requires fine control of transmission power.

Thus, the digital communication systems are replacing the analog communication systems since the former systems have excellent features over the latter. However, digital and analog systems coexist while shifting to the digital communications. Mobile stations must be dual-mode terminals adapted to analog and digital systems.

Figure 1A:
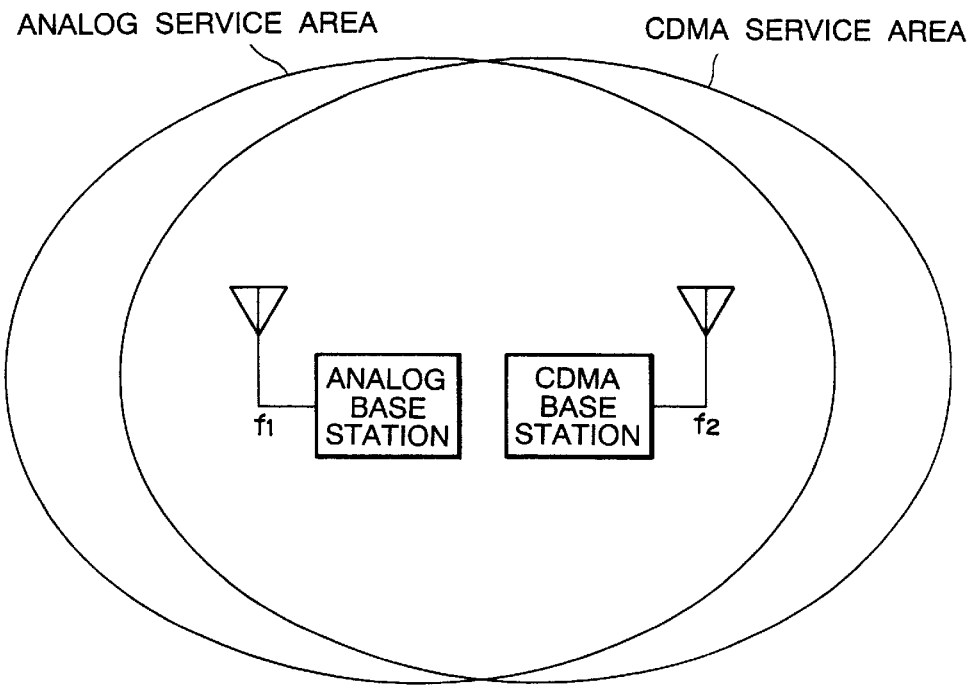
FIG. 1A is illustrative of service areas of an analog system and a digital CDMA system.
Figure 1B:
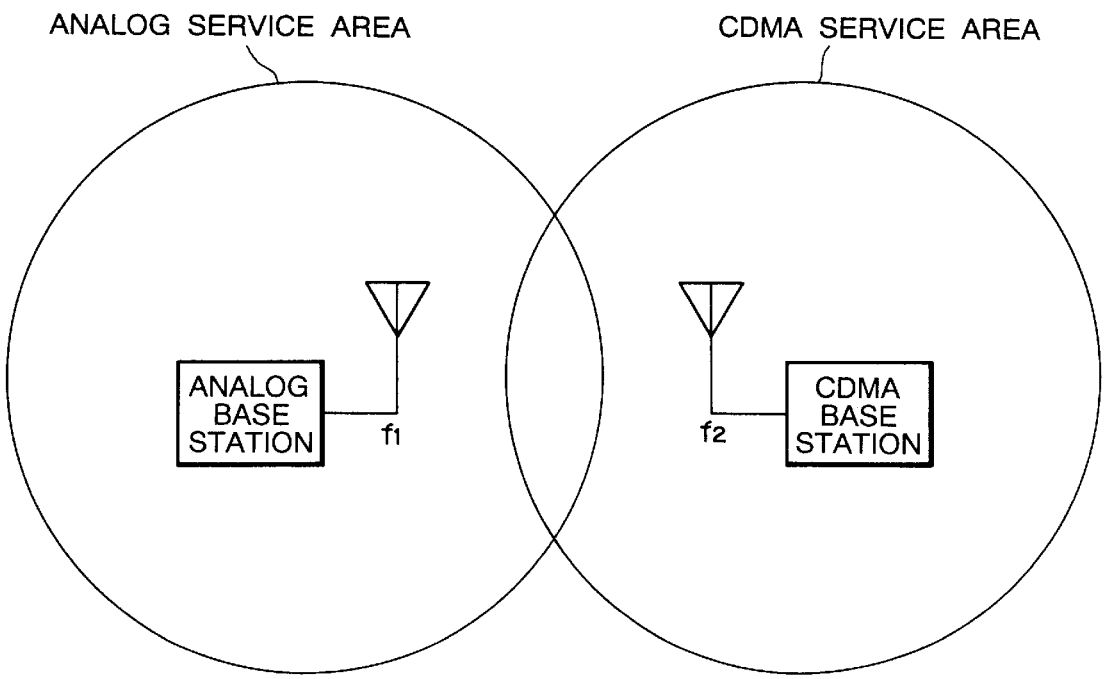
FIG. 1B is illustrative of service areas of another analog system and a digital CDMA system.

In the dual-mode cellular telephone systems adapted to the analog system and the digital CDMA system, analog and digital systems can work in different frequency spectra in the same area or neighboring areas as shown in FIGS. 1A and 1B. However, in the shown cases, the following four kinds of wave interference modes may occur between the base stations and mobile stations of two different systems.

(1) Interference from the analog base station to the digital CDMA mobile station;

(2) Interference from the digital CDMA base station to the analog mobile station;

(3) Interference from the analog mobile station to the digital CDMA base station and (4) Interference from the digital CDMA mobile station to the analog base station.

Figure 2:
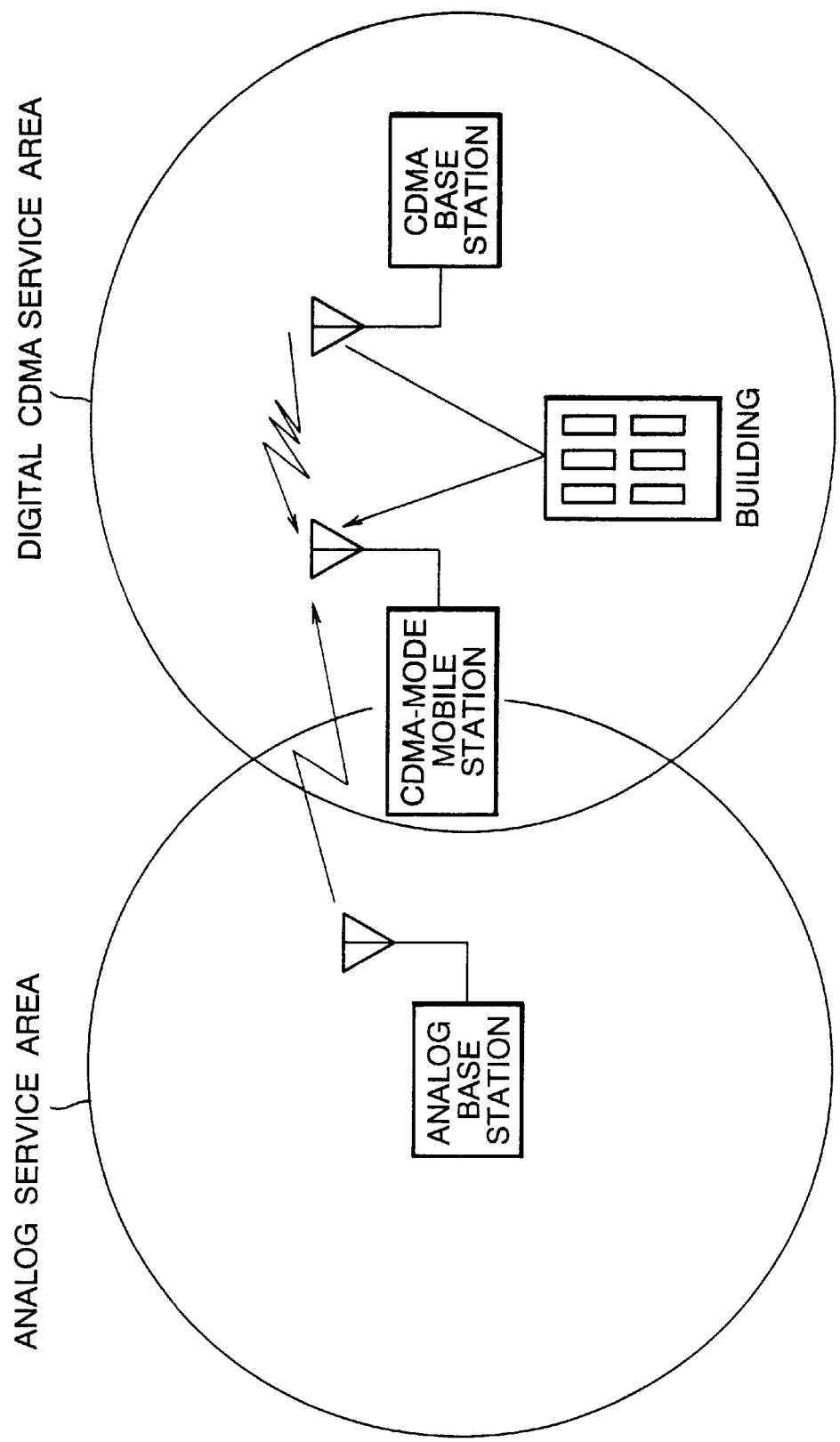
FIG. 2 is illustrative of an interference of an analog base station on a digital CDMA mobile station.
Figure 3:
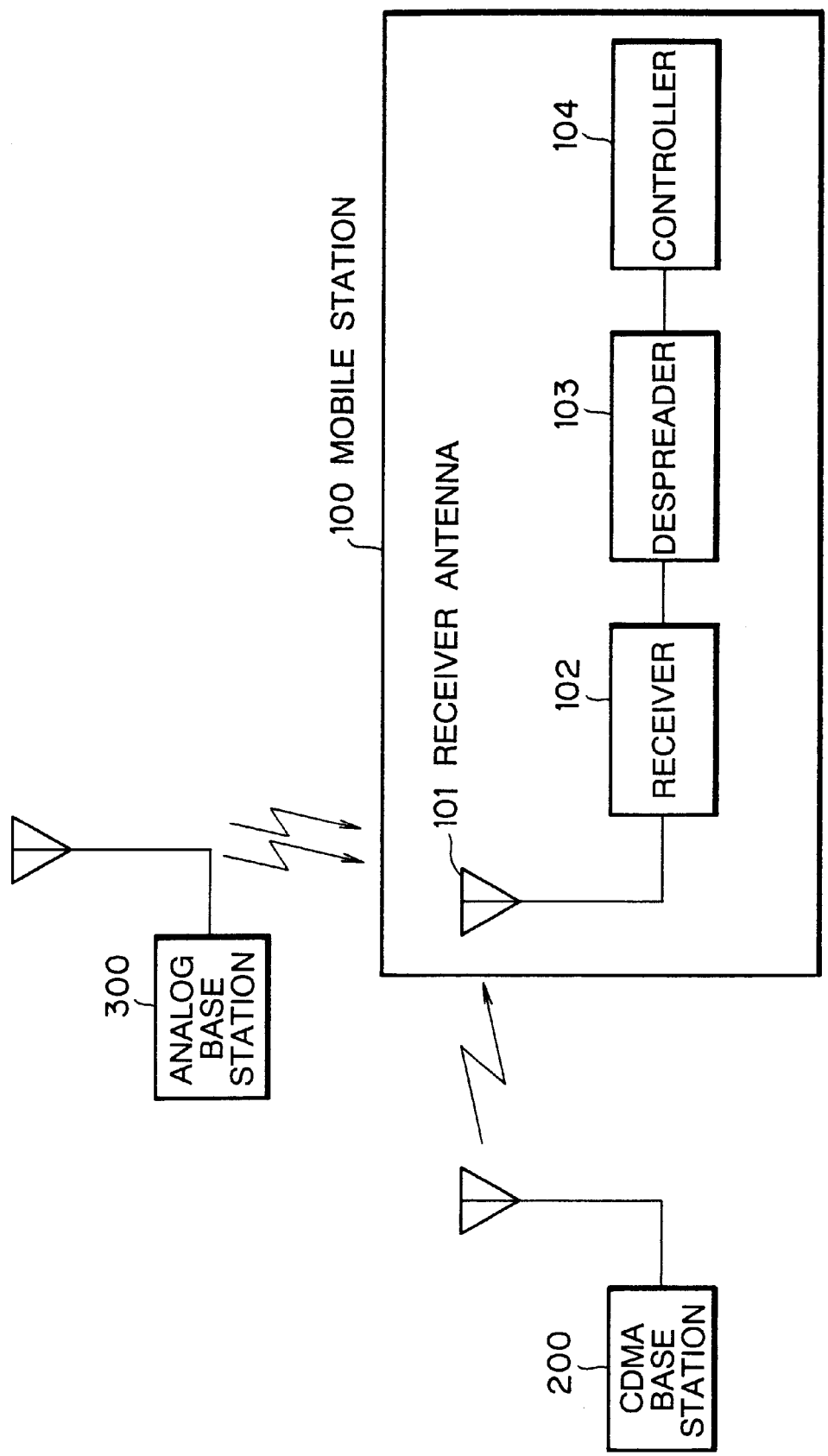
FIG. 3 is view for explaining another interference of an analog base station on a digital CDMA mobile station.

Among the above, interference mode (1) is the most important. Namely, the interference mode (1) becomes very large at a mobile station working in the digital CDMA mode as shown in FIG. 2 if the mobile station locates far from the CDMA base station and near to the analog base station. FIG. 3 is a view for explaining a disturbance by interference from an analog base station to a digital CDMA mobile station. The mobile station 100 is communicating in the CDMA mode with a CDMA base station 200, receiving, at the same time, a number of narrow-band signals as disturbing signals from an analog base station 300 existing in the neighboring area. In this case, the narrow-band analog signals may largely affect the mobile station 100 since they have much higher level than the desired CDMA-band signal.

Three interference modes may occur as follows:

(a) An interference by intermodulation distortion caused from non-linearity of a receiver of the CDMA mobile station;

(b) An interference by intermodulation distortion caused from non-linearity of a transmitter system of the analog base station;

(c) An interference by sideband noises of transmission signals from the analog base station.

Figure 4:
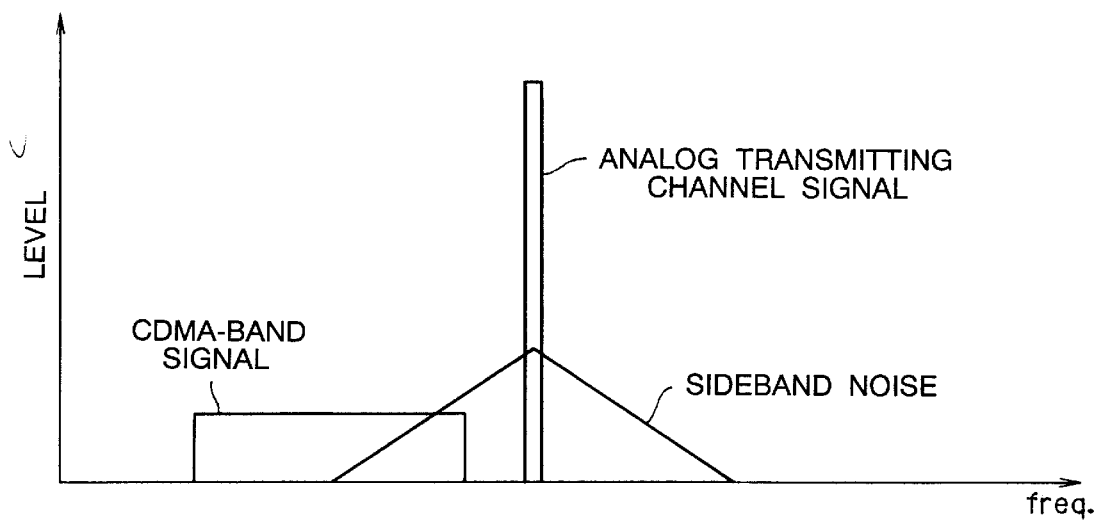
FIG. 4 is a graph showing an interference of sideband-noises of transmission channel signal of an analog base station.

Referring to FIG. 4, the interference mode (c) is a phenomenon that sideband noises of an analog signal from an analog base station may fall, as a disturbing signal, into a bandwidth of the CDMA system if the analog transmission-channel bandwidth is near the CDMA bandwidth. The effect of this mode is smaller than the modes (a) and (b).

Figure 5:
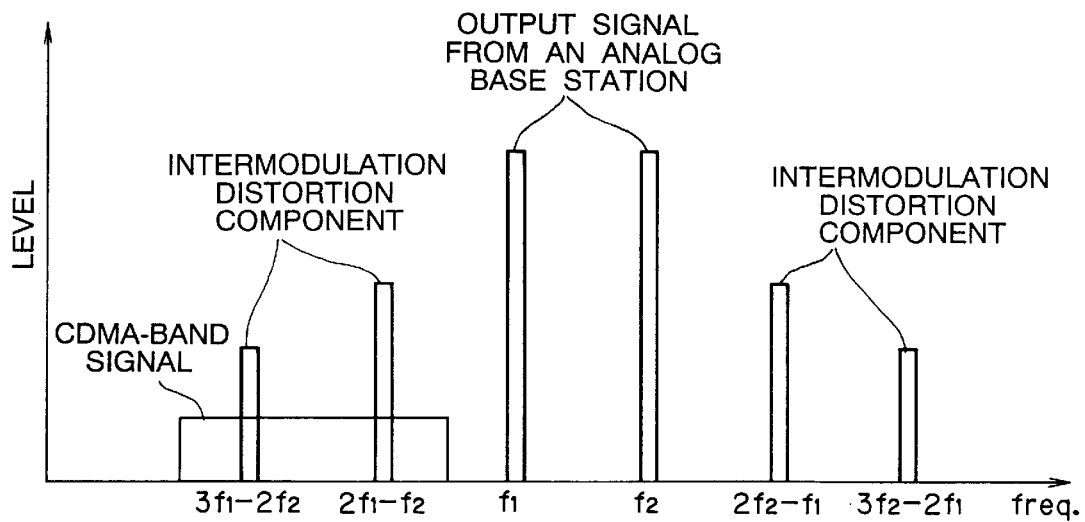
FIG. 5 is a graph showing a narrow-band disturbance due to intermodulation distortion.
Figure 6:
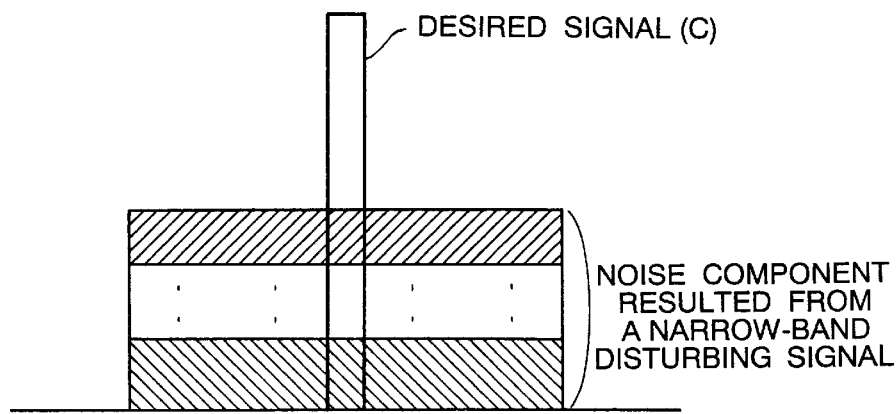
FIG. 6 is a graph showing a spectrum after despreading with a narrow-band disturbing signal.

The causes and problems of interference modes (a) and (b) are as follows:

FIG. 5 illustrates a case that a mobile station 100 working in the CDMA mode are receiving a number of analog system signals. When a large-power level narrow-band analog signals ($f_1$, $f_2$ and so on) are input to a receiver 102, a large number of third and fifth intermodulation distortions ($2f_1-f_2$, $2f_2-f_1$, $3f_1-2f_2$, $3f_2-2f_1$ and so on) may occur in a receiver 102 due to the non-linearity of its components (e.g., a LNA (Low Noise Amplifier), mixer and so on), producing a large number of narrow-band disturbing signals in a frequency band corresponding to the CDMA band. The produced narrow-band disturbing signals having very high levels results in increasing noise level after despreading the received signal by the despreader 103. Consequently, such a problem arises that the signal may represent erroneous data due to its insufficient carrier-to-noise (C/N) ratio as shown in FIG. 6.

Figure 7:
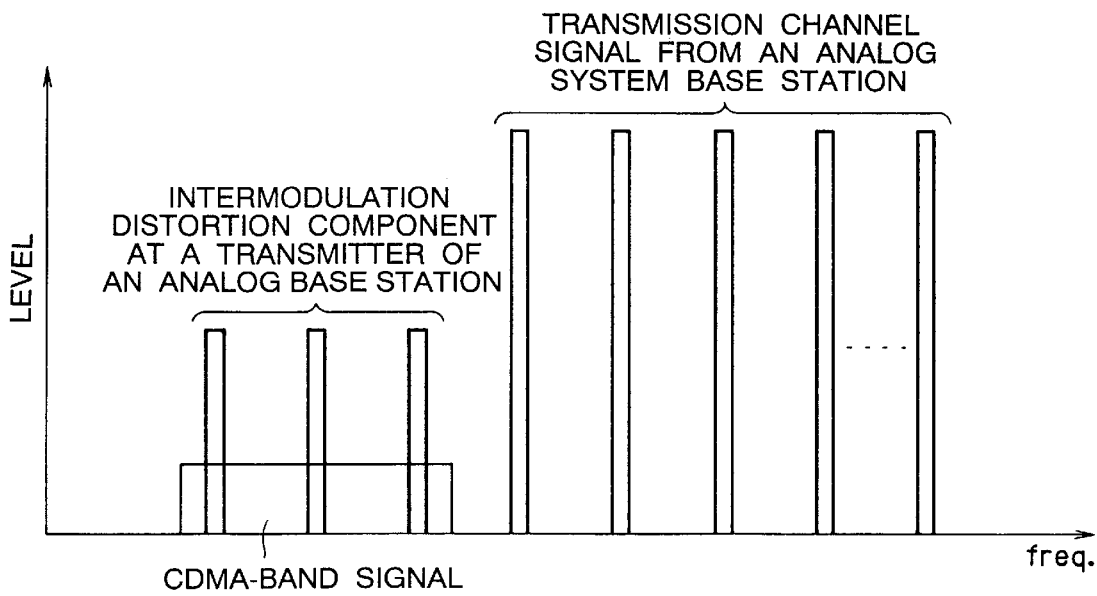
FIG. 7 is a graph showing a distortion component of an intermodulation of a transmission channel signal and a transmission system at an analog base station.

As shown in FIG. 7, an analog base station 300 transmits a large number of narrow-band signals at a time and, therefore, may produce a large number of narrow-band disturbing signals within a frequency band corresponding to a CDMA band due to intermodulation distortions (of 3rd-order, 5th-order and so on) if its transmission system (transmission power amplifier) has non-linearity. Accordingly, the analog transmission system is usually designed so that intermodulation distortion may be satisfactorily small. However, the CDMA mobile station 100 may receive at its receiver 102 a relatively high-level narrow-band disturbing signal while it works near the analog base station 300. Consequently, a noise level of the received signal is increased after despreading by a despreader 103. An erroneous data may be produced due to insufficient carrier-to-noise ratio. This is a problem to be solved.

Preferred embodiments of the present invention will be described below in detail with reference to accompanying drawings wherein portions similar to those of the system according to the above-described conventional system are given the same numerals.

Figure 8:
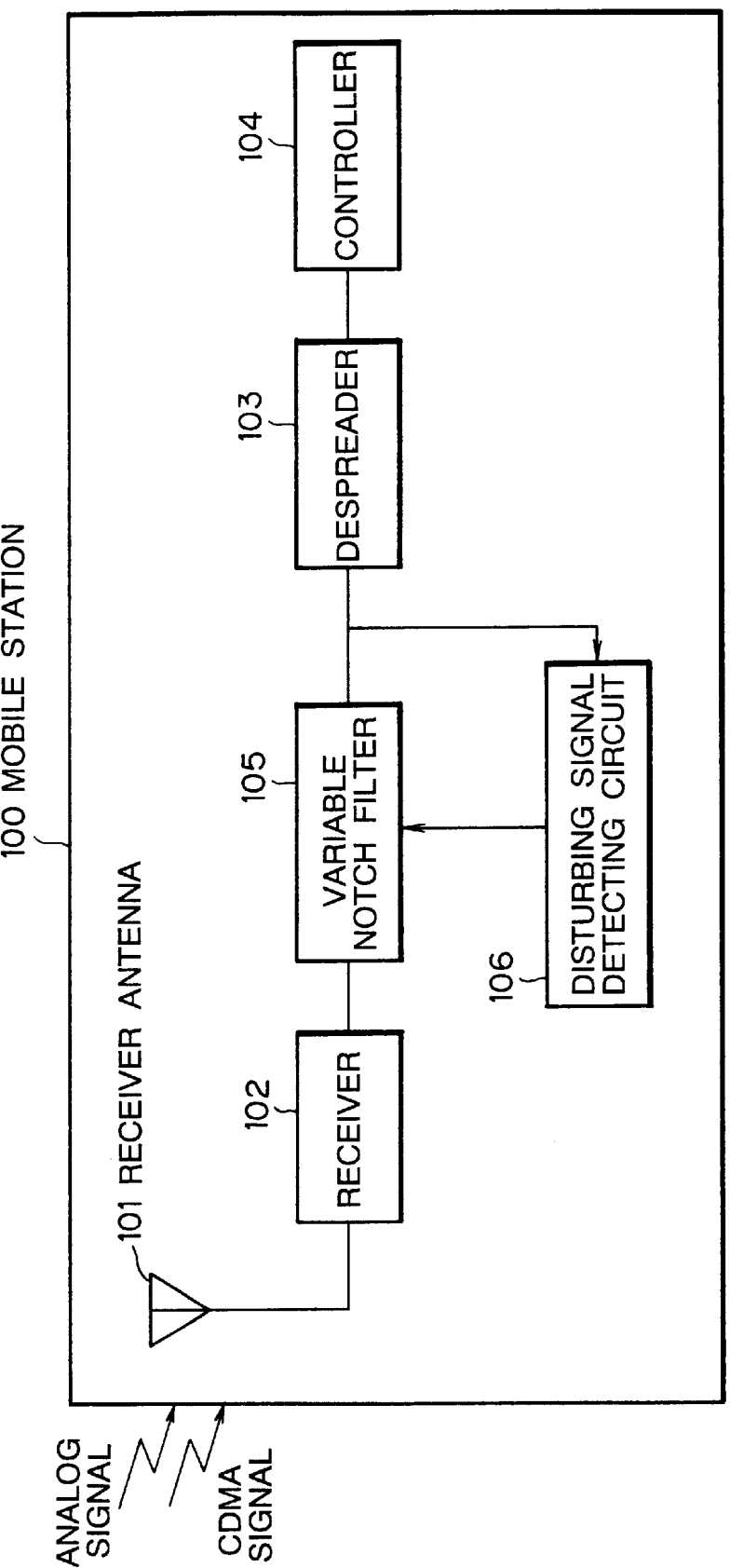
FIG. 8 is a construction diagram of a narrow-band disturbing signal suppression circuit of a mobile station in a dual-mode cellular telephone system, which is an embodiment of the present invention.

FIG. 8 shows a block diagram of a narrow-band disturbing signal suppression circuit mounted in a mobile station 100 of a dual-mode cellular telephone system embodying the present invention.

Figure 9:
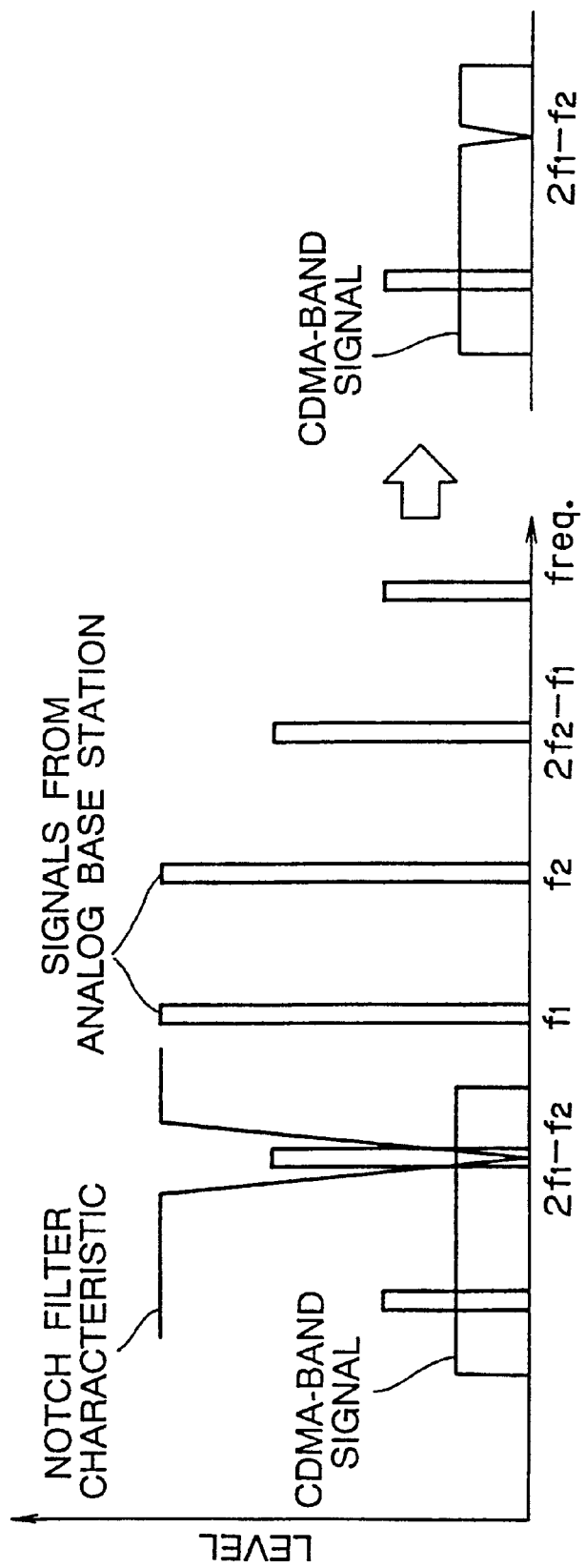
FIGS. 9(a) and 9(b), hereinafter referred to as FIG. 9, are graphs showing an effect of a notch filter in suppressing a narrow-band disturbing signal.

In FIG. 8, a CDMA signal from a CDMA base station and an analog signal from an analog base station are received by a receiver antenna 101. The received signals are input to a receiver 102 whereby they are subjected to amplification arid frequency conversion and then input to a variable notch filter 105 being supplied with a notch-frequency varying control signal from a disturbing signal detecting circuit 106. By sweeping the control signal, the disturbing signal detecting circuit 106 changes the notch frequency of the variable notch filter 105 to detect a frequency at which the notch filter has a minimal output level. As shown in FIG. 9, a narrow-band disturbing signal little remains within the CDMA band when the notch frequency meets with the narrow-band disturbing signal giving a largest influence ((a) in FIG. 9). Namely, the variable notch filter 105 has a minimal output level. Accordingly, a sufficient carrier-to-noise ratio of a signal after despreading can be attained by giving the variable notch filter 105 the control signal causing the notch filter to have the minimal output level ((b) in FIG. 9).

In FIG. 9, there is shown a notch filter having a notch frequency. The use of a notch filter having a plurality of notch frequencies attains a further increased effect.

Figure 10:
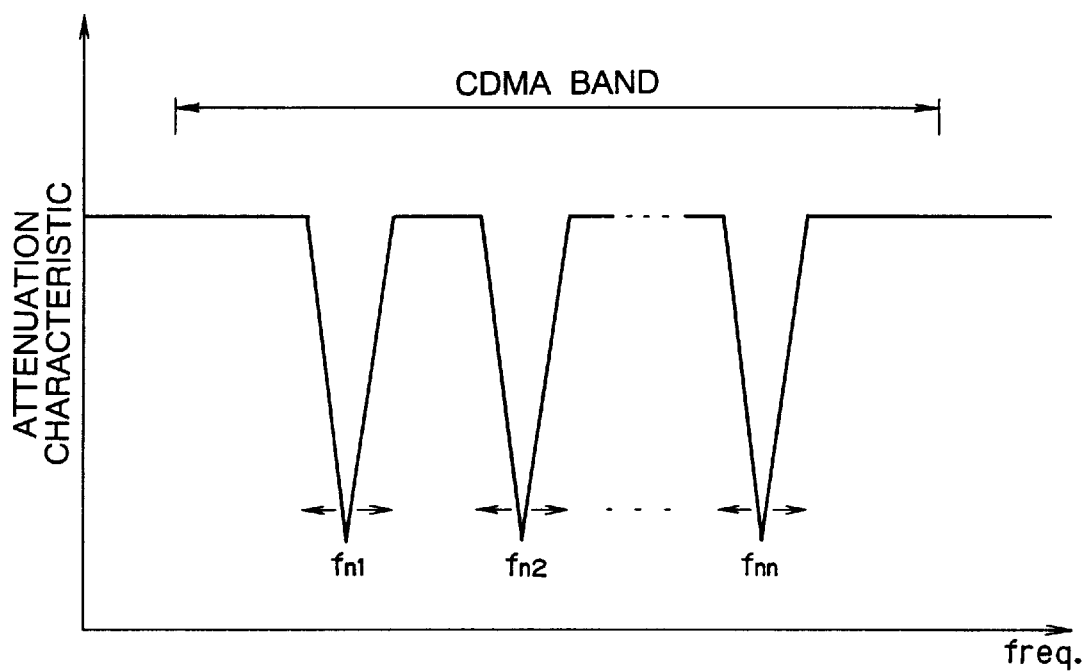
FIG. 10 is a graph showing an attenuation characteristic of a notch filter when working with a plurality of notch frequencies.

FIG. 10 is a graph showing an attenuation frequency-characteristic of a variable notch filter 105 having a plurality of notch frequencies to be varied. The disturbing signal detection circuit 106 separately changes notch frequencies ($f_{n1}$, $f_{n2}$, ... $f_{nn}$) and detects a combination of the plurality of notch frequencies, which causes the variable notch filter 105 has a minimal output level. Then, it gives the notch filter 105 a control signal that produces the above-mentioned effect.

Figure 11:
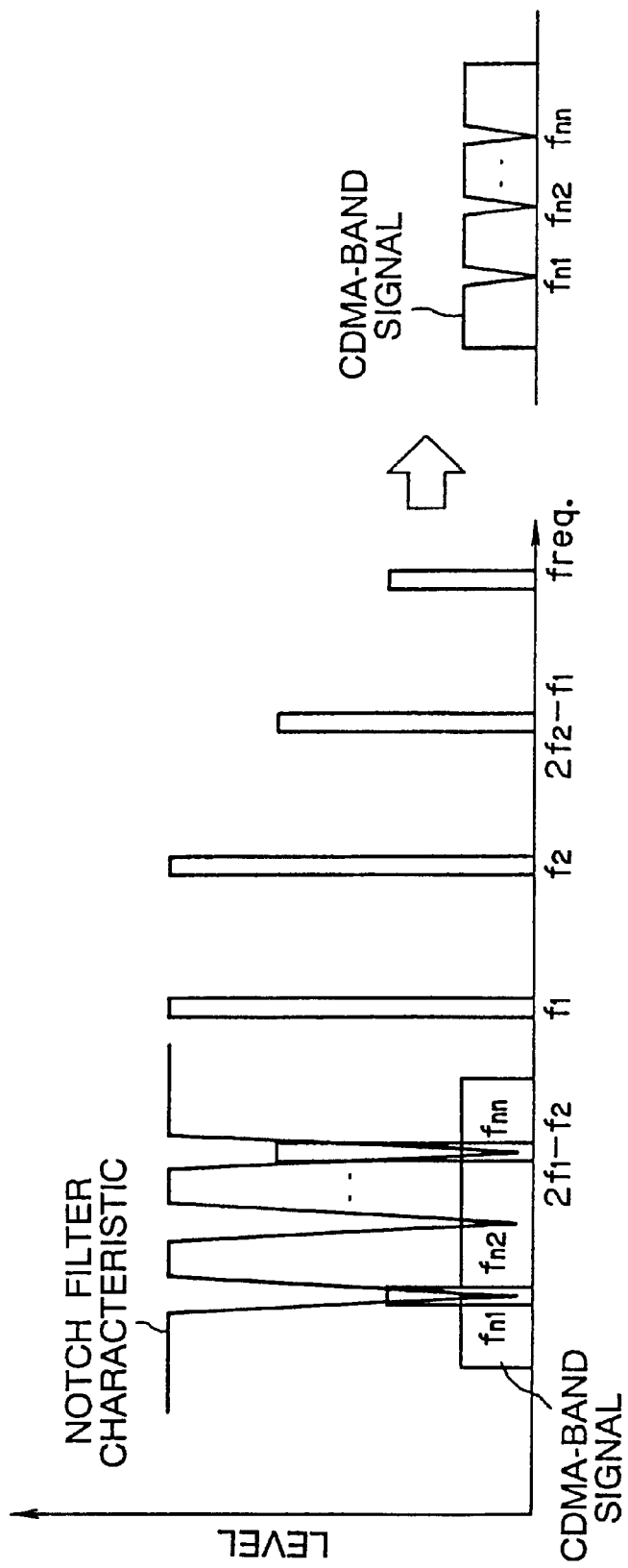
FIGS. 11(a) and 11(b), hereinafter referred to as FIG. 11, are graphs showing an effect of a notch filter in suppressing a narrow-band disturbing signal when working with a plurality of notch frequencies.

In this case, as shown in FIG. 11, it is possible to suppress a number of narrow-band disturbing signal at the same time by using a plurality of notch frequencies. This can further improve a carrier-to-noise ratio of a desired signal after despreading. A method of sweeping a plurality of notch frequencies is as follows: The CDMA frequency band is divided into the same number of sub-bands as that of notch frequencies and the respective notch frequencies are swept on the respective frequency bands. This feature can fast detect a minimum output level of the variable notch filter 105.

For example, with the variable notch filter 105 having two notch frequencies ($f_{n1}$, $f_{n2}$), the CDMA frequency band is divided into two (low and high) bands and two notch frequencies are swept from respective band ends. This enables a high-speed detection of the notch frequencies.

It is also possible to first determine a combination of a number of notch frequencies, fix some of the notch frequencies and continue sweeping of remaining notch frequencies. In this instance, the variable notch filter 105 may largely vary its output level when a considerable change in interference level of a disturbing signal occurs during communications. Namely, the disturbing signal detecting circuit 106 can detect a change in an interference level of disturbing signals by a change in an output level of the variable notch filter 105. Accordingly, the disturbing signal detection circuit 106 can follow a change in the interference condition during communication by giving a control signal corresponding to the change to the variable notch filter 105.

In a dual-mode cellular system working in an analog mode and a digital CDMA mode, frequency channels are usually known and, therefore, a frequency band that may cause a narrow-band disturbance can be previously calculated by the controller 104. Therefore, it is possible to reduce an influence of the narrow-band disturbance from the initial stage of communication by giving a control signal based upon the calculation result to the variable notch filter 105.

In the foregoing description, the variable notch filter 105 is used with its notch characteristic being ON from the beginning. However, this may cause an attenuation of a desired CDMA signal received if there is no high-level disturbing signal that may cause a problem. Accordingly, the disturbing signal detection circuit 106 may control the variable notch filter 105 not to initially exert a notch characteristic. Namely, the disturbing signal detection circuit 106 monitors the output level of the variable notch filter 105 and control the variable notch filter to exert a notch characteristic only when the output level of the notch filter 105 exceeds the predetermined reference level. The ON-OFF control of notch characteristic according to the degree of influence of the narrow-band disturbing signal may realize an adaptive suppression of disturbing signals.

Figure 12:
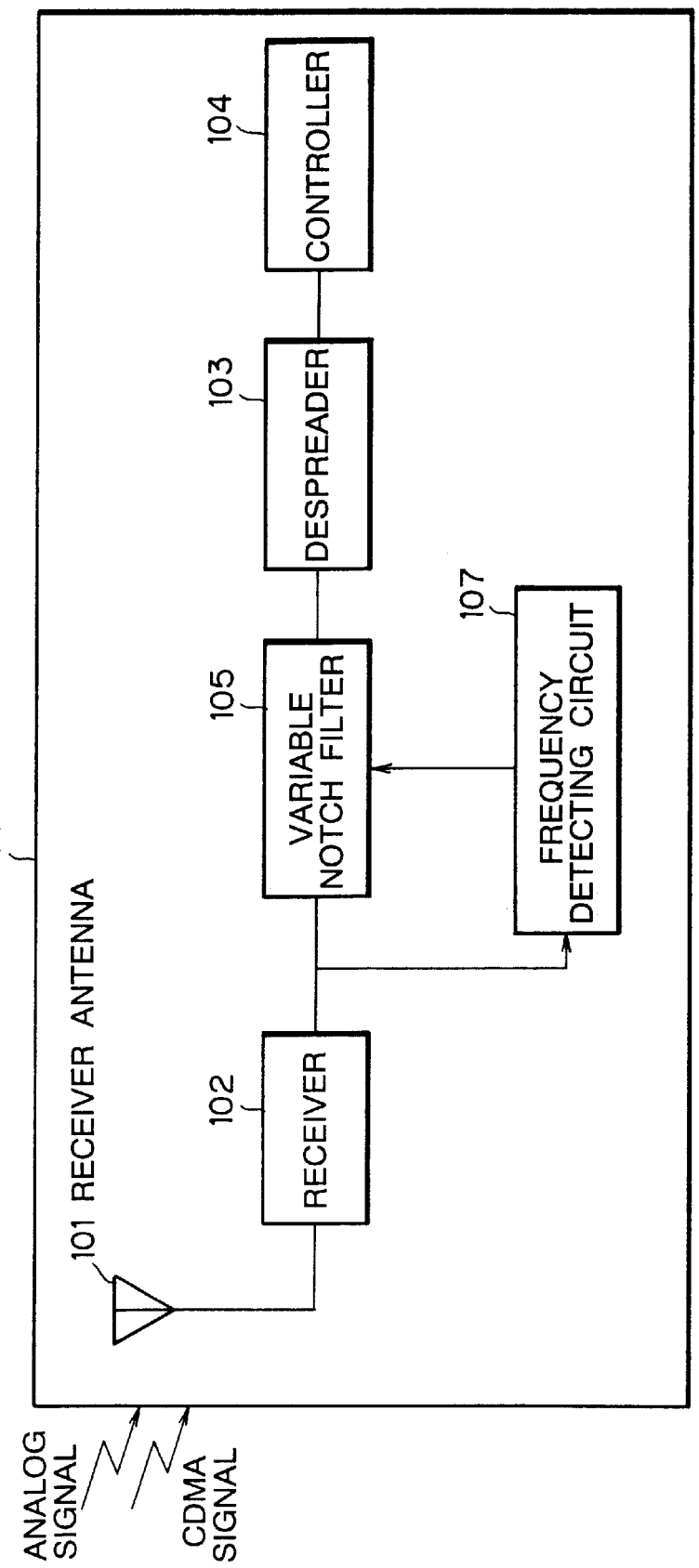
FIG. 12 is a construction diagram of a narrow-band disturbing signal suppression circuit of a mobile station in a dual-mode cellular telephone system, which is another embodiment of the present invention.

FIG. 12 is a block diagram of a narrow-band disturbing signal suppression circuit used in a mobile station 100 for a dual-mode cellular telephone system which is another embodiment of the present invention. In FIG. 12, components similar in function to those of FIG. 8 are given the same numerals. The difference of this embodiment from the embodiment shown in FIG. 8 is that a frequency detecting circuit 107 is used in place of the disturbing signal detection circuit 106. The frequency detecting circuit 107 analyzes a frequency of a CDMA signal outputted from a receiver 102, for example, by performing Fourier transformation.

In the shown embodiment, the frequency detecting circuit 107 has an output being reflective of a high-level narrow-band disturbing signal if such one contained in a received CDMA signal. Accordingly, a frequency of the most influential narrow-band disturbing signal can be found and a control signal causing a variable notch filter 105 to have a notch frequency suppressing the frequency component, thus attaining an excellent carrier-to-noise ratio of an output at a despreader 103.

With an input containing a number of narrow-band disturbing signals of a similar level, the frequency detecting circuit 107 has an output reflecting these frequency components. Accordingly, the variable notch filter 105 having a plurality of notch frequencies is used for the above-mentioned case, assuring further reduction of an influence of the narrow-band disturbance.

The use of the variable notch filter 105 being always switched ON may cause an attenuation of a desired CDMA signal received if there is no high-level disturbing signal that, may cause a problem. And the attenuation of a desired CDMA signal brings the receiving characteristic for the worse. Accordingly, the frequency detecting circuit 107 may control the variable notch filter 105 not to initially exert notch characteristic. Namely, the frequency detecting circuit 107 observes the output level of the receiver 102 and controls the variable a proper notch characteristic filter to execute notch only when the output level of the receiver 102 exceeds a predetermined reference level. The ON-OFF control of notch characteristic according to the degree of influence of the narrow-band disturbing signal may realize an adaptive suppression of disturbing signals.

Figure 13:
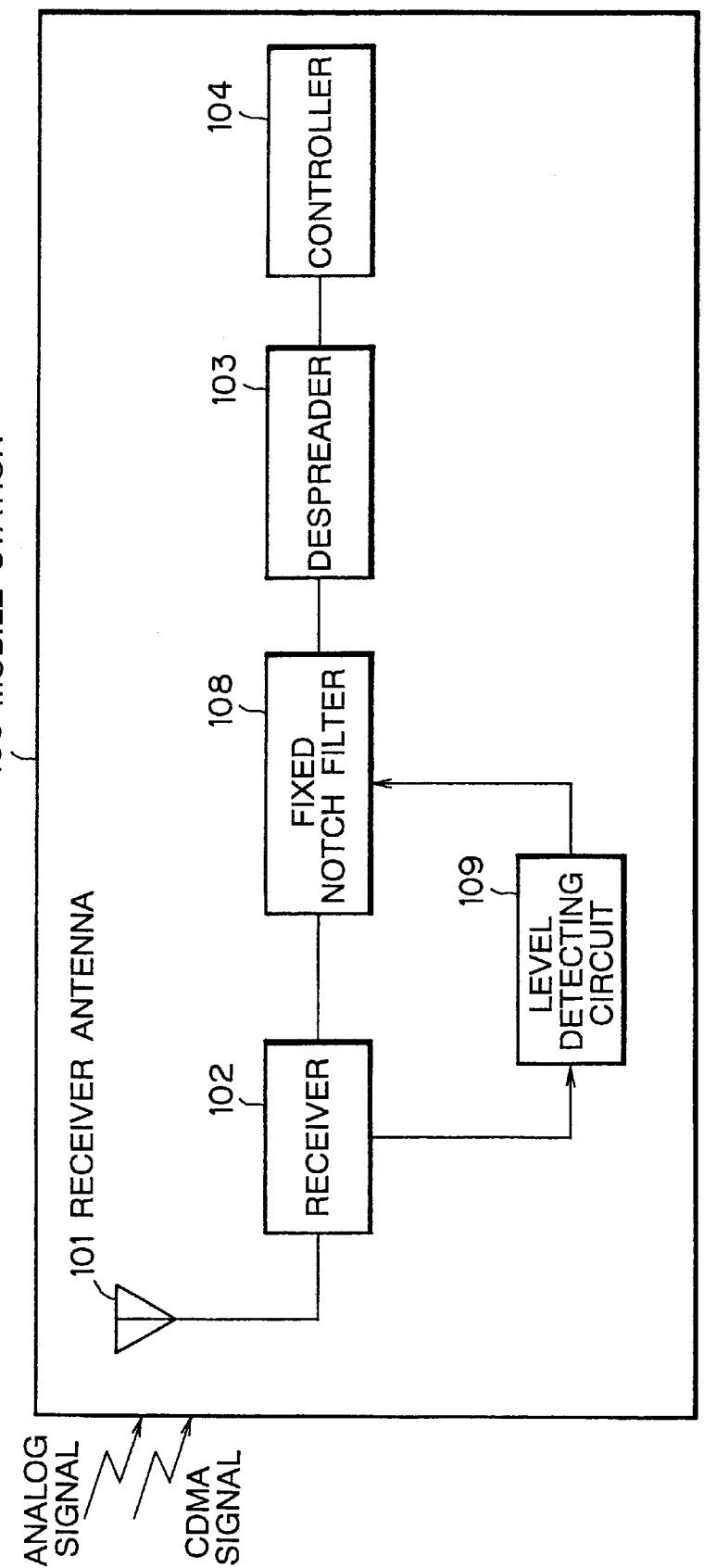
FIG. 13 is a construction diagram of a narrow-band disturbing signal suppression circuit of a mobile station in a dual-mode cellular telephone system, which is a further embodiment of the present invention.

FIG. 13 is a block diagram of a narrow-band disturbing signal suppression circuit used in a mobile station 100 for a dual-mode cellular telephone system which is a further embodiment of the present invention. In FIG. 13, components similar in function to those of FIGS. 8 and 12 are given the same numerals. The difference of this embodiment from the embodiments shown in FIGS. 8 and 12 exists in that a notch frequency is fixed by using a fixed notch filter 108 in place of the variable notch filter 105. This design makes the structure of the disturbing signal suppressing circuit be simple since it eliminates the necessity of using the disturbing signal detection circuit 106 or the frequency detecting circuit 107.

As described before with reference to FIG. 8, the dual-mode telephone system working in an analog mode and a CDMA digital mode usually uses known frequency channels and can therefore predict a frequency band causing a narrow-band disturbance. Accordingly, it is possible to reduce an influence of the narrow-band disturbance by designing fixed notch filter 108 having a notch frequency based on the prediction result. The notch filter 108 may have, of course, a plurality of fixed notch frequencies. Furthermore, it is also possible to provide a level detecting circuit 109 that monitors an output level of a receiver 102 and switches ON the notch characteristic of the fixed notch filter 108 only when the output of the receiver 102 exceeds a predetermined reference level. Namely, the ON-OFF control of notch characteristic according to the degree of influence of the narrow-band disturbing signal may realize an adaptive suppression of disturbing signals.

In comparison with the embodiments of FIGS. 8 and 12, the embodiment of FIG. 13 is somewhat inferior in its ability of suppressing narrow-band disturbing signals but has a simplified circuit construction that does not require control and is adapted to high-speed processing.

With the dual-mode cellular telephone system provided with a narrow-band disturbing signal suppression circuit according to the present invention, a narrow-band disturbing signal at a mobile station of the dual-mode telephone system adapted to the analog and digital CDMA signals can be effectively suppressed by a notch filter to maintain well-conditioned telecommunication. A number of narrow-band disturbing signals can be suppressed at the same time by using a plurality of notch frequencies. Thus, the receiving characteristic can be further improved.

Rapid suppression of disturbing signals by following a change in disturbance level of interference signals during communications can be realized by how to sweep notch frequencies.

The ON-OFF control of the notch filter characteristic can realize an adequate suppression of any disturbing signal depending on the influence of the actual narrow-band disturbing signal.

All these facilities of the dual-mode cellular telephone system realize the smooth shift from the analog system to the digital CDMA system that possesses a higher performance and a larger capacity.

We claim:

1. A dual-mode cellular telephone system adapted for an analog system and a digital CDMA system and having a mobile station with a narrow-band disturbing signal suppression circuit for suppressing intermodulation distortion produced from signals received from an analog base station, comprising:

a receiver for receiving analog signals from an analog base station and CDMA signals from a CDMA base station;

a notch filter for suppressing a disturbing signal resulting from intermodulation distortion within the received analog and CDMA signals, said notch filter supplied with a variable notch frequency;

a level detecting circuit for monitoring an output level of said receiver; said level detecting circuit controlling said notch filter to possess a specified notch characteristic only in the case where said output level exceeds a predetermined reference level; and a disturbing signal detecting circuit for controlling said variable notch frequency, said disturbing signal detecting circuit selecting a specified value at which said notch filter has a minimum output to control the variable notch frequency supplied to said notch filter.

2. A dual-mode cellular telephone system adapted for an analog system and a digital CDMA system and having a mobile station with a narrow-band disturbing signal suppression circuit for suppressing intermodulation distortion produced inside the mobile station upon receiving transmission channel signals from an analog base station, comprising:

an antenna for receiving analog signals from an analog base station and CDMA signals from a CDMA base station;

a receiver for receiving analog and CDMA signals input by said antenna;

a notch filter for suppressing a disturbing signal resulting from intermodulation distortion within the received analog and CDMA signals, said notch filter supplied with a variable notch frequency;

a level detecting circuit for monitoring an output level of said receiver; said level detecting circuit controlling said notch filter to possess a specified notch characteristic only in the case where said output level exceeds a predetermined reference level; and a disturbing signal detecting circuit for controlling said variable notch frequency, said disturbing signal detecting circuit selecting a specified value at which said notch filter has a minimum output to control the variable notch frequency supplied to said notch filter.

3. A dual-mode cellular telephone system as defined in claim 1 or 2, wherein said notch filter has a plurality of variable notch frequencies controlled by said disturbing signal detecting circuit, said disturbing signal detecting circuit selecting a combination of the plurality of notch frequencies at which said notch filter has a minimum output, and supplying said notch filter with a control signal based on the selected combination.

4. A dual-mode cellular telephone system as defined in claim 3, wherein the notch filter has two notch frequencies being variable at a time, one of which is variable within a lower sub-band of a desired band, the other variable within a higher sub-band of said desired band.

5. A dual-mode cellular telephone system as defined in claim 3, wherein after said combination of the plurality of notch frequencies is determined, several of said plurality of notch frequencies are fixed and other notch frequencies are continuously changed while detecting a change in an output level of said notch filter during communications.

6. A dual-mode cellular telephone system as defined in claim 3, wherein said disturbing signal detecting circuit monitors an output level of said notch filter and, only in the case of said output level exceeding a predetermined reference level, controls said notch filter to have a specified notch characteristics.

7. A dual-mode cellular telephone system as defined in claim 1 or 2, wherein said disturbing signal detecting circuit monitors an output level of said notch filter and, only in the case of said output level exceeding a predetermined reference level, controls said notch filter to have a specified notch characteristic.

8. A dual-mode cellular telephone system as defined in claim 1 or 2, wherein said notch filter is provided with a frequency detecting circuit for analyzing a frequency component exerting a narrow-band disturbance on a CDMA-band signal, and for supplying said notch filter with a control signal corresponding to the detected frequency component.

9. A dual-mode cellular telephone system as defined in claim 8, wherein said frequency detecting circuit performs Fourier transformation.

10. A dual-mode cellular telephone system as defined in claim 8, wherein said frequency detecting circuit monitors a received signal level of said mobile station and, only in the case of the received signal level exceeding a predetermined reference level, controls said notch filter to have a specified notch characteristic.

* * * * *